United States Patent
Fisher et al.

(10) Patent No.: US 12,540,825 B2
(45) Date of Patent: Feb. 3, 2026

(54) DYNAMIC ROUTE GENERATION AND CHARGER DISCOVERY

(71) Applicant: Rivian IP Holdings, LLC, Irvine, CA (US)

(72) Inventors: Evelyn Anne Fisher, Bozeman, MT (US); Colin William Crenshaw, Portola Valley, CA (US); Jason Bertrand Rapp, Seabrook, TX (US); Bo Gunnar Olof Lincoln, Lund (SE)

(73) Assignee: Rivian IP Holdings, LLC, Irvine, CA (US)

( * ) Notice: Subject to any disclaimer, the term of this patent is extended or adjusted under 35 U.S.C. 154(b) by 166 days.

(21) Appl. No.: 18/332,991

(22) Filed: Jun. 12, 2023

(65) Prior Publication Data
US 2024/0410701 A1    Dec. 12, 2024

(51) Int. Cl.
*G01C 21/34* (2006.01)
*G01C 21/36* (2006.01)
*G06N 20/00* (2019.01)

(52) U.S. Cl.
CPC ..... *G01C 21/3415* (2013.01); *G01C 21/3469* (2013.01); *G01C 21/3492* (2013.01); *G01C 21/3617* (2013.01); *G01C 21/3682* (2013.01); *G01C 21/3694* (2013.01); *G06N 20/00* (2019.01)

(58) Field of Classification Search
CPC ............ G01C 21/3415; G01C 21/3469; G01C 21/3492; G01C 21/3617; G01C 21/3682; G01C 21/3694; G06N 20/00
USPC ........................................................ 701/411
See application file for complete search history.

(56) References Cited

U.S. PATENT DOCUMENTS

| | | | |
|---|---|---|---|
| 11,815,557 B2 * | 11/2023 | Gering | H01M 10/44 |
| 2003/0006914 A1 * | 1/2003 | Todoriki | B60L 53/64 |
| | | | 701/423 |
| 2012/0109519 A1 * | 5/2012 | Uyeki | B60L 53/68 |
| | | | 701/426 |
| 2015/0275788 A1 | 10/2015 | Dufford et al. | |

(Continued)

FOREIGN PATENT DOCUMENTS

| WO | WO-9416304 A1 * | 7/1994 | B60L 1/003 |
|---|---|---|---|
| WO | WO-2012058022 A2 * | 5/2012 | B60L 11/1803 |

OTHER PUBLICATIONS

Non-Final Office Action on U.S. Appl. No. 18/365,708 dated Sep. 30, 2025.

*Primary Examiner* — Tuan C To
(74) *Attorney, Agent, or Firm* — Foley & Lardner LLP

(57) ABSTRACT

Dynamic route generation and charger discovery is provided. A system identifies a drive route for a vehicle. The drive route includes a first charger at a first location along the drive route configured to charge a battery of the vehicle. The system receives an indication of an amount of power output by the battery of the vehicle and an indication of a speed of the vehicle as the vehicle traverses the drive route. The system receives the indication via a battery management system of the vehicle. The system predicts, via a model trained with machine learning, a characteristic of the vehicle based on the amount of power and the speed. The system updates, responsive to the characteristic predicted via the model based on the amount of power and the speed, the drive route to include a second charger at a second location to charge the battery of the vehicle.

16 Claims, 7 Drawing Sheets

(56) References Cited

U.S. PATENT DOCUMENTS

| | | |
|---|---|---|
| 2018/0017399 A1 | 1/2018 | Rolnik |
| 2020/0164763 A1* | 5/2020 | Holme .................... B60L 58/16 |
| 2021/0072323 A1* | 3/2021 | Gering .................. H02J 7/0071 |
| 2021/0155108 A1* | 5/2021 | Martin .................... B60L 53/35 |

* cited by examiner

DYNAMIC ROUTE GENERATION AND CHARGER DISCOVERY

INTRODUCTION

Vehicles can drive from one location to another based on a trip plan.

SUMMARY

This disclosure is generally directed to dynamic route generation and charger discovery. It can be challenging to accurately and reliably determine when and where to re-charge an electric vehicle during a trip due to the various attributes or factors that can arise when traversing a route. Systems and methods of this technical solution can use a model trained with machine learning that can recalculate and recalibrate when and where to re-charge an electrical vehicle based on currently sensed data that can capture the driving behavior of the vehicle. Factors can include: change in driving mode, unforeseen driving behavior, mass estimation or drag being higher than previously determined, battery preconditioning timing being longer than predicted due to changes in weather or temperature, improved route planning based on mass estimation change (e.g., towing or large load in truck bed) combined with drive mode, or charger location information (e.g., layout of charger stations and actual operational data). The sensed data can be fed into a Kalman filter or fit to a polynomial curve in order to increase the weight of more recent data relative to older data. Examples of sensed data can include the speed of the vehicle and the amount of power output by the vehicle's battery.

At least one aspect is directed to a system. The system can include a computing system having one or more processors, coupled with memory. The computing system can identify a drive route for a vehicle. The drive route can include a first charger at a first location along the drive route configured to charge a battery of the vehicle. The computing system can receive an indication of an amount of power output by the battery of the vehicle and an indication of a speed of the vehicle as the vehicle traverses the drive route. The computing system can receive the indication via a battery management system of the vehicle. The computing system can predict, via a model trained with historical battery consumption data, a characteristic of the vehicle based on the amount of power and the speed. The computing system can update, responsive to the characteristic predicted via the model based on the amount of power and the speed, the drive route to include a second charger at a second location to charge the battery of the vehicle.

At least one aspect is directed to a method. The method can be performed by a computing system having one or more processors coupled with memory. The method can include the computing system identifying a drive route for a vehicle. The drive route can include a first charger at a first location along the drive route configured to charge a battery of the vehicle. The method can include the computing system receiving an indication of an amount of power output by the battery of the vehicle and an indication of a speed of the vehicle as the vehicle traverses the drive route. The method can include the computing system receiving the indication via a battery management system of the vehicle. The method can include the computing system predicting, via a model trained with historical battery consumption data, a characteristic of the vehicle based on the amount of power and the speed. The method can include the computing system updating, responsive to the characteristic predicted via the model based on the amount of power and the speed, the drive route to include a second charger at a second location to charge the battery of the vehicle.

At least one aspect is directed to an electric vehicle. The electric vehicle can include a computing system having one or more processors, coupled with memory. The electric vehicle can include a battery and a battery management system to control performance of the battery. The computing system can identify a drive route for a vehicle comprising a first charger at a first location along the drive route configured to charge a battery of the vehicle. The computing system can receive, via a battery management system of the vehicle, an indication of an amount of power output by the battery of the vehicle and an indication of a speed of the vehicle as the vehicle traverses the drive route. The computing system can predict, via a model trained with historical battery consumption data, a characteristic of the vehicle based on the amount of power and the speed. The computing system can update, responsive to the characteristic predicted via the model based on the amount of power and the speed, the drive route to include a second charger at a second location to charge the battery of the vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
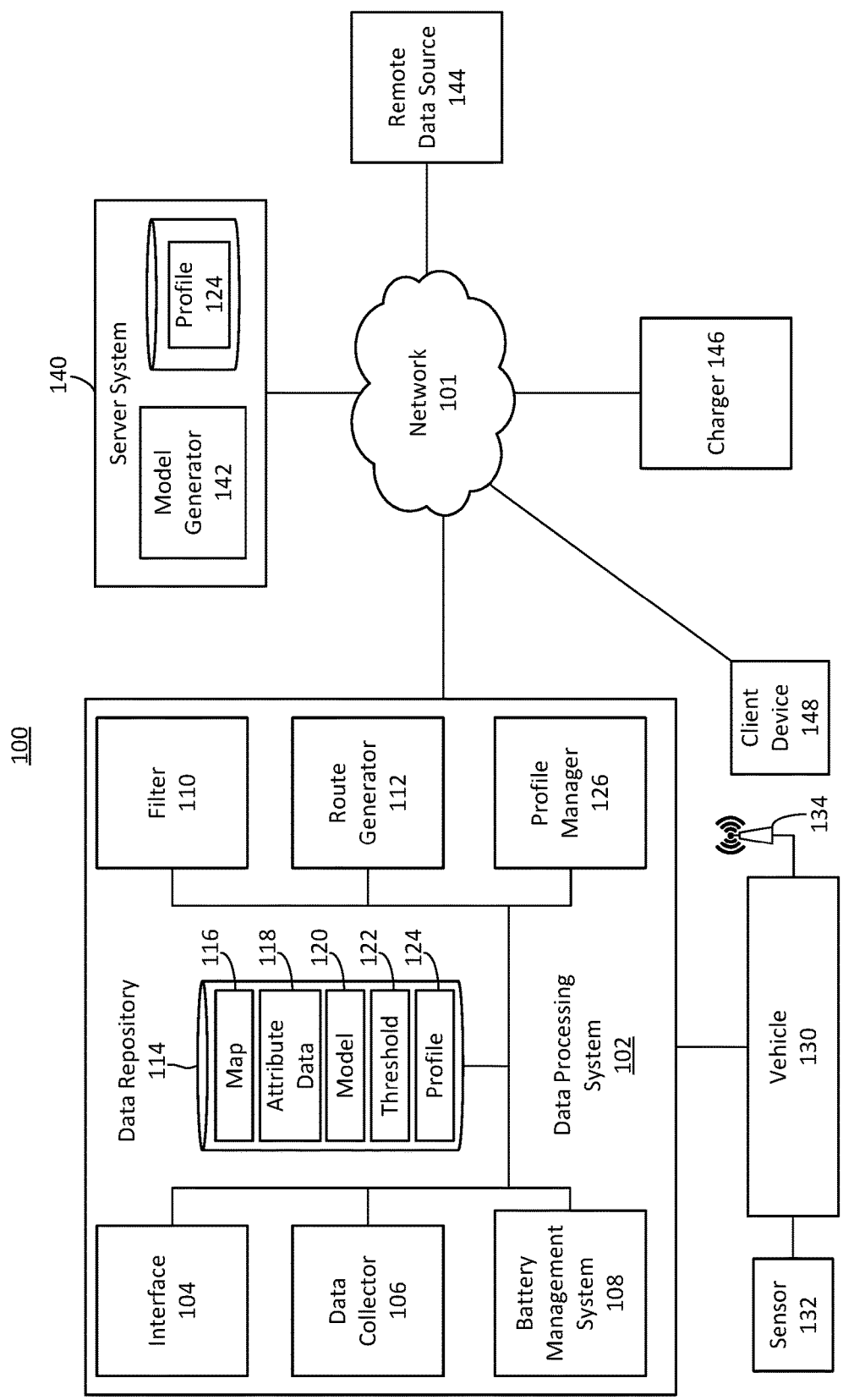
FIG. 1 depicts an example system of dynamic route generation and charger discovery.

Following below are more detailed descriptions of various concepts related to, and implementations of, methods, apparatuses, and systems of dynamic route generation and charger discovery. The various concepts introduced above and discussed in greater detail below can be implemented in any of numerous ways.

This disclosure is generally directed to dynamic route generation and charger discovery. It can be challenging to accurately and reliably determine when and where to recharge an electric vehicle during a trip due to the various attributes or factors that can arise when traversing a route. This technical solution can take into account attributes, factors or conditions that arise or are detected or determined after a vehicle begins a trip from a first destination to a second destination. For example, when setting up the initial route to a destination, the system can determine initial attributes such as the weight or mass of a vehicle, a drive mode, attributes of the route, elevation, and weather at the time of setting the route. With these initial attributes, the system can identify or select one or more charging stations along the route for the vehicle to charge at during the route. This technical solution can collect additional data during the route in order to refresh or recalculate the route based on a time interval (e.g., every 2 minutes, 3 minutes, 3 minutes, 5 minutes, 10 minutes or other time interval). By collecting additional data during the route in order to refresh, recalculate, or update the route, this technical solution can improve the accuracy of the route by, for example, making more accurate range estimates.

To dynamically update the route based on the sensed data, this technical solution can use a model trained with machine learning. The machine learning model can be developed and configured to update, recalculate, or otherwise recalibrate based on the data collected or sensed during the traversal of the route, such as based on a driving style. The system can perform this update responsive to a time interval (e.g., every 2 minutes, 3 minutes, 3 minutes, 5 minutes, 10 minutes or other time interval), a condition, detecting a change to a vehicle attribute, or detecting a change to the expected vehicle efficiency and energy use. For example, this technical solution can improve the accuracy of the route traversed by the vehicle and refresh the route using a recalibration that can take into account one or more of the following: a change in drive mode; unforeseen driving behavior (e.g., driving the vehicle at a speed that is greater than a threshold for an amount of time greater than a time interval, or accelerating the vehicle by an amount that is greater than a threshold for an amount of time greater than a time interval), the mass estimation and drag being higher than previously determined; battery preconditioning timing being longer than predicted due to changes in weather or temperatures; improved route planning based on mass estimation change (e.g., towing or large load in truck bed) and combined with drive mode; charger location information (e.g., layout of the charger stations and actual operational data) and known tow configuration).

FIG. 1 depicts an example system 100 of dynamic route generation and charger discovery. The system 100 can include a data processing system 102. The data processing system 102 can be referred to as, or include, a computing system or computer system (e.g., one or more component of computer system 700 depicted in FIG. 7). The data processing system 102 can be located on or within an electric vehicle 130. The data processing system 102 can be hosted by the electric vehicle 130. One or more component or functionality of the data processing system 102 can be hosted on, or performed by, the server system 140. For example, the filter 110 or route generator 112 can be hosted on the server system 140, and communicate with the data processing system 102 hosted on the vehicle 130 to provide a drive route or updated drive route. The data processing system 102 can communicate or interface with one or more sensors 132. The sensor 132 can be any type of sensor that can collect, measure, detect, or otherwise identify data or information that can facilitate dynamic route generation. Sensors 132 can include, for example, a wheel speed sensor, global positioning system sensor, temperature sensor, accelerometer, gyroscope, rain sensor, anemometer, ambient light sensor, or weight sensor. The vehicle 130 can include a wireless access point 134 designed, constructed and operational to transmit data via one or more wireless communication protocols. For example the wireless access point 134 can communicate data via short-range data transmissions using radio waves, such as via Bluetooth. The wireless access point 134 can communicate via Wi-Fi. The wireless access point 134 can include an antenna that is located inside or outside of the vehicle 130. The wireless access point 134, or antenna thereof, can be communicatively coupled with the interface 104 of the data processing system 102.

The data processing system 102 can include one or more of an interface 104, a data collector 106, a filter 110, a route generator 112, a battery management system 108, or a data repository 114. The data repository can include at least one of a map 116, attribute data 118, a model 120, a threshold 122, or a profile 124. The system 100 can include, interface, access or otherwise communicate with a server system 140, remote data source 144, or charging station 146 via a network 101. The server system 140, remote data source 144, or charging station 146 can each communicate with the data repository 114.

The data repository 114 can be any memory, storage, or cache for storing information or data structures that facilitates the data processing system 102 to perform dynamic route generation and charger discovery. The data repository 114 can contain any information about the system 100 and can allow that information to be accessed by any components of the data processing system 102. The map 116 can refer to or include digital maps that can facilitate navigating from one location to another. The digital map 116 can include information about roads, highways, or paths a vehicle can traverse. The digital map 116 can include real-time information, such as traffic or weather at a location. The digital map 116 can include information about speed limits. The map 116 can include altitude information. The digital map 116 can be obtained from a remote data source 144 or server system 140, and stored in data repository 114. The map 116 can be updated periodically or based on another time interval or condition. The map 116 can include information about chargers 146 that are located along a drive route or vicinity. The map 116 can include information about the types of chargers, power delivery mechanisms or rates of the chargers, or layout of a site on which the charger is located.

Attribute data 118 can refer to or include data that can be collected by one or more sensors 132 or from a remote data source 144. Attribute data can include a time series of data samples, such as speed of the vehicle, acceleration of the vehicle, mass, drag, power output by the battery of the vehicle, battery state of charge, battery state of health, or temperature. Model 120 can refer to or include a model trained with machine learning. The model 120 can be trained by the model generator 142 of the server system 140, and provided to the data processing system 102 for deployment. The threshold 122 data structure can include various thresholds used by the data processing system 102 to perform dynamic route generation and charger discovery, such as speed thresholds, acceleration thresholds, drag thresholds, power thresholds, or temperature thresholds. Thresholds 122 can be fixed, absolute, dynamic, percentages, or based on a function.

The profile 124 can include or refer to a profile associated with a driver or user of the vehicle. The data repository 114 can include or store one or more profiles 124. The profile 124 can be retrieved or obtained from the server system 140, and loaded or stored in the data repository 114. For example, the server system 140 can store or maintain the profile 124. The profile 124 can include information that can facilitate the data processing system operate an aspect of the vehicle 130. The profile 124 can include one or more configurations or preferences of the user or driver of the vehicle. The preferences can be established or provided by the driver or user. The preferences or configurations can be established by a manufacturer of the vehicle 130 or other operator of the vehicle 130. The preferences can be determined or learned based on driving behavior.

The profile 124 can include or indicate preferences that can facilitate selecting a charger for inclusion in a drive route. For example, the profile can include or indicate a preference or configuration for charger types (e.g., charging station port), charger speed, charger operator, or charger layout. Charger types can refer to or include a configuration of a plug or connector of the charger, or a voltage level allowed by the charger. Charger speed can refer to or indicate the maximum power output of the charger, such as in units of kilowatt-hours. Charger operator can refer to or indicate the entity, organization, or company that manufactured or operates the charger. The charger operator can refer to or indicate the charging network to which the charger belongs. The charger layout can refer to or indicate the site layout associated with the charger, or whether the charger is oriented in such a manner that vehicles that are towing objects can couple or connect to the charger.

Information in the data repository 114 can be stored in any kind of memory, such as a cloud or hard drive. The data repository 114 can include, for example, random access memory (RAM), dynamic random access memory (DRAM), static random access memory (SRAM), error-correcting code (ECC), read only memory (ROM), programmable read only memory (PROM), or electrically erasable read only memory (EEPROM). The data repository 114 can be accessed at any time and by any component of system 100.

The network 101 can include any kind of communications link, cables, transmitters, receivers, transceiver, logic circuit, communication chip, communication network (e.g. a local area network ("LAN"), a wide area network ("WAN"), or an inter-network (the internet) cellular network (e.g., 3G, 4G, or 5G)), configured to allow or facilitate communication, transmission, reception, or connection with the components of the system and with outside systems. The network 101 can be a private network or a public network. The network 101 can allow for communication with or between the data processing system 102, the charger station 146, the remote data source 144, or the server system 140.

The system 100 can include, interface with, utilize, or otherwise communicate with a server system 140. The server system 140 can include one or more component or functionality of computing device 700, including, for example, one or more processors and memory. The server system 140 can refer to or include a cloud computing environment. The server system 140 can communicate with the data processing system 102 via network 101. For example, the server system 140 can receive data or transmit data to the data processing system 102. The server system 140 can provide instructions, software, or commands to the data processing system 102 to facilitate dynamic route generation and charger discovery. For example, the server system 140 can include a model generator 142 designed, constructed and operational to train, establish, or generate a model using one or more machine learning techniques. The model generator 142 can re-train, update, modify, calibrate, or otherwise maintain or improve the model.

To establish the model, the data processing system 102 (e.g., model generator 142) can train the model with historical battery consumption data. The data processing system 102 can train the model using various functions or signal processing techniques. The data processing system 102 can train the model with the model generator 142 using machine learning, can obtain training data. The training data can include historical data that corresponds to attribute data 118. For example, the training data can include or correspond to attribute data 118 that includes historical battery consumption data of one or more vehicles, such as battery state of charge or battery state of health, and corresponding vehicle attributes, such as speed, acceleration, or range of use between charges. The training data can be aggregated from multiple vehicles. The training data can be simulated data. The training data can be combination of measured or sensed data using one or more sensors 132 and simulated data. The training data can include ground truth data, and labels.

For example, the model generator 142 can collect data to use for training or validation purposes. The model generator 142 can gather, obtain, or receive data about electric vehicles, such as battery capacity, charging speed, usage pattern, location, planned routes, traffic information, elevation information along routes, power output by the battery of the vehicle, speed of the vehicle, or battery state of health. The model generator 142 can collect data about environmental conditions associated with usage of the electric vehicle, such as weather conditions, temperature, and time of day.

The model generator 142 can preprocess the collected data. The model generator 142 can preprocess the data by cleaning and formatting the data so that it can be used to train the machine learning model. Preprocessing can include removing outliers, converting data into a suitable format, or normalizing the data. The model generator 142 can preprocess the data by binning or bucketizing the data. For example, numeric speed data can be binned by converting the numeric value to a bin value. The model generator 142 can be configured with a predetermined set of bins, such as bins at 5 mile increments, 10 mile increments, 15 mile increments, or other bin values. By converting numeric speed values into bins, the model generator 142 can reduce the complexity of training the model 120, or the complexity of the model 120 itself. By reducing the complexity of the model 120, the model generator 142 can improve the efficiency with which the data processing system 102 can use the model 120 in real-time to dynamically generate or update routes. When the data processing system 102 inputs the data into the model 120 to make predictions, the data processing system 102 can process the data in real-time during the trip to make accurate predictions or improve the accuracy of range estimates.

The model generator 142 can be train the model to determine, select, or predict a time and location to charge an electric vehicle during a trip so that the vehicle reaches its destination with enough charge while minimizing charging time, cost, or number of charging stops. The model generator 142 can select a machine learning technique or function, or be configured with a machine learning technique or function that is designed to generate a model that can dynamically generate or update a route and discover chargers. For example, the machine learning technique can include a decision tree. The model generator 142 can use the decision tree to build a model 120 that predicts the optimal time and location to charge an electric vehicle based on the input features such as the attribute data 118 including, for example, one or more of battery level of the vehicle, the distance to the destination, and the availability of charging stations along the route.

The model generator 142 can select or be configured with a machine learning technique including random forests. Random forests can include an ensemble of decision trees that can improve the accuracy of predictions or range estimates by combining multiple decision trees. The model generator 142 can use random forests to build a model 120 that predicts, determines, or selects a time and location to charge an electric vehicle based on a set of input features such as the power output by the battery of the vehicle, the speed of the vehicle, temperature, weather, acceleration, distance to the destination, driving behavior, or availability of charging stations along the route, for example.

The model generator 142 can select or be configured with a machine learning technique including a support vector machine (SVM). SVM can refer to or include a supervised learning function that can classify and predict outcomes based on input features. The model generator 142 can use SVM to determine, select or predict a time and location to charge the electric vehicle based on input features such as the power output by the battery of the vehicle, the speed of the vehicle, temperature, weather, acceleration, distance to the destination, driving behavior, traffic data, or availability of charging stations along the route, for example.

The model generator 142 can select or be configured with a machine learning technique including a neural network. A neural networks can include a type of machine learning technique that is designed, constructed and operational to learn complex patterns in data. The model generator 142 can use neural networks to build the model 120 to select, determine, or predict a time and location to charge an electric vehicle based on input features such as the power output by the battery of the vehicle, the speed of the vehicle, temperature, weather, acceleration, distance to the destination, driving behavior, traffic data, or availability of charging stations along the route, for example.

The model generator 142 can select or be configured with a machine learning technique including a Bayesian network. A Bayesian network can refer to or include a probabilistic graphical model that can be used to represent and reason about uncertain knowledge. The model generator 142 can use the Bayesian network to build a model 120 that determines, selects, or predicts a time and location to charge an electric vehicle based on input features such as the power output by the battery of the vehicle, the speed of the vehicle, temperature, weather, acceleration, distance to the destination, driving behavior, traffic data, or availability of charging stations along the route, for example.

To train the model using the selected machine learning technique, the model generator 142 can feed the preprocessed data into the model, and allow the model to learn from decisions and consequences. For example, a vehicle can be simulated to move along a route, and the model can continuously evaluate different charging options and select the optimal one based on the learned policy.

The model generator 142 can evaluate the model 120 prior to deploying the trained model 120 to the data processing system 102. The model generator 142 can evaluate the performance of the model 120 by comparing the predicted values with the actual values and determining metrics such as mean squared error, mean absolute error, and R-squared value, in some cases, the model generator 142 can evaluate the ability of the model 120 to adapt to new situations and data that it has not seen before.

The model generator 142 (e.g., via server system 140) can deploy the model 120 to the data processing system 102 located on the electric vehicle 130. In some cases, the model 120 can be deployed on a data processing system 102 located on a cloud server to provide real-time, dynamic route generation and charger discovery during a trip. In some cases, the model can be integrated with a mobile application executing on a client computing device that can provide updated route and charging suggestions to the driver.

The model generator 142 can monitor and refine the model 120 based on feedback received from the electric vehicle 130 or other data sources. The model generator 142 can update the model 120 responsive to receiving new data and parameters to improve the predictions made by the model 120 over time.

The system 100 can include, interface with, communicate with, or otherwise utilize one or more remote data sources 144. A remote data source 144 can provide data or information such as weather data (e.g., current or forecasted weather information), traffic information, charger information (e.g., locations of chargers, charger site information, charger layout information), or map information. The remote data source 144 can receive a request for information via an application programming interface. The remote data source 144 can provide the requested information via network 101 in response to the request. In some cases, the remote data source 144 can be configured to provide a feed or data stream of the requested information to the data processing system 102 via network 101.

The system 100 can include, access, or otherwise utilize one or more chargers 146. The charger can refer to or include any type of charger that can charge or provide power to a battery of the electric vehicle 130 to allow the electric vehicle 130 to drive along a route. The charger 146 can be electrically connected to an electric utility distribution grid. The charger 146 can include a power cable that can connect to the electric vehicle 130. The charger 146 can be located at a charging station that includes multiple chargers 146. The charger 146 can be located on a physical or geographic site. The site can have a layout that includes one or more chargers 146. Depending on the layout of the site, it may be challenging for electric vehicles 130 that are towing a trailer to pull into the site to connect with the charger 146 to charge the electric vehicle 130.

The system 100 can include, access or otherwise communicate with or utilize one or more client devices 148. The client device 148 can include one or more system, component or functionality of the computing system 700 depicted in FIG. 7, including, for example, at least one processor, memory, interface or display device. The client device 148 can refer to or include a mobile computing device, such as a smartphone, wireless telecommunications device, tablet, or wearable computing device (e.g., smart watch or smart glasses). In some cases, the client device 148 can refer to or include a smart card, such as a physical card that includes an embedded integrated chip.

The client device 148 can communicate with one or more component or system of the vehicle 130. For example, the client device 148 can communicate with the data processing system 102 via a wireless access point 134. The client device 148 can communicate with one or more system or component of system 100 via network 101, including, for example, the server system 140, remote data source 144, charger 146, or data processing system 102. The wireless access point 134 can broadcast signals that can be detected by the client device 148 and cause the client device 148 to establish a communication session with the data processing system 102. For example, by broadcasting a signal, the wireless access point 134 can cause the client device 148 and the data processing system 102 to initiate a handshaking process to establish a communication session between the client device 148, or application thereof, and the data processing system 102.

The client device 148 can host, execute, or run an application. The client device 148 can launch or invoke the application. The application can be provided by a manufacturer of the vehicle 130. For example, the client device 148 can download the application via an online application store or marketplace. The application can be developed or provided by the manufacturer of the vehicle 130. The manufacturer of the vehicle 130 can configure the application to communicate or interface with the vehicle 130, or data processing system 102 of the vehicle 130. The client device 148 can execute the application to cause the application to communicate with the data processing system 102 via the wireless access point 134 of the vehicle 130. The client device 148 can establish, update, or configure one or more preferences of the profile 124. For example, the profile 124 can indicate one or more preferences. The profile 124 can include or indicate preferences for at least one of charger type, charger speed, charger operator, or charger layout. The application executing on the client device 148 can load the profile 124 onto the data processing system 102. The client device 148 can transmit the profile 124 to the data processing system 102. The client device 148 can transmit the profile to the server system 140. In some cases, the client device 148 can instruct the data processing system 102 to download the profile 124 from the server system 140.

The data processing system 102 can provide one or more functions or otherwise facilitate controlling the vehicle 130. The data processing system 102 can include an interface 104 designed, constructed and operational to communicate via network 101. The interface 104 can provide a user interface. For example, the interface 104 can include or provide a graphical user interface, such as the graphical user interfaces 200 or 300 depicted in FIG. 2 or FIG. 3, respectively. The interface 104 can receive input from a user or driver of the vehicle 130. The interface 104 can output information in various modes, such as visual, audio, or haptic output.

The data processing system 102 can include a profile manager 126 designed, constructed and operational to load, maintain, establish or apply a profile to the vehicle 130. The profile manager 126 can detect a key fob or client device 148 associated with a driver or user of the vehicle 130. The profile manager 126, responsive to detecting the key fob or client device 148, can load a profile 124 that is linked to the key fob or client device 148. The profile manager 126 can load the profile 124 or otherwise apply the one or more preferences of the profile 124 to one or more system, component or function of the data processing system 102. By loading the profile 124, the profile manager 126 can cause the components of the data processing system 102 (e.g., the route generator 112) to generate or update drive routes based at least in part on the preferences of the profile 124. For example, the data processing system 102 can generate or update drive routes for the vehicle in accordance with, consistent with, or based on the preferences of the profile 124. In some cases, the profile manager 126 can provide a graphical user interface via a dashboard of the vehicle 130 through which the user can select, adjust, configure, or establish one or more aspects of the profile 124. In some cases, the profile manager 126 can download the profile 124 from the server system 140. The profile manager 126 can download the profile 124 from the server system 140 via network 101 responsive to detecting a key fob or client device 148 linked with the profile 124.

The data processing system 102 can include a battery management system 108 designed, constructed and operational to manage or control performance of the battery of the vehicle 130. The battery management system 108 can measure, detect, or determine an amount of power output by the battery of the vehicle 130. The battery of the vehicle can be a high voltage battery that provides power to the electric motors of the vehicle 130 to drive the vehicle along the route. The battery management system 108 can determine, measure, or otherwise detect a total amount of power being output by the battery of the vehicle 130. The battery management system 108 can recite a time series of data samples that indicate the power being output by the battery at a time stamp. The power can be in units of Watts or Kilowatts.

The data processing system 102 can include a data collector 106 designed, constructed and operational to receive, detect, obtain, or otherwise identify data used by the data processing system 102 to dynamically generate or update a route. The data collector 106 can receive data from one or more sensors 132. The data collector 106 can receive data from the battery management system 108. The data collector 106 can receive data from one or more remote data sources 144. The data collector 106 can request data from the sensor 132, or receive a data feed or data stream from the sensor 132. The data collector 106 can receive data corresponding to at least one a mass of the vehicle 130, a drive mode of the vehicle (e.g., comfort mode, offroad, or sport mode), elevation of the drive route, or weather along the drive route.

The data processing system 102 can include a filter 110 designed, constructed and operational to process or preprocess the data obtained by the data collector 106. The filter 110 can filter, modify, clean, fill in, aggregate, or otherwise process the data prior to providing the data to the route generator 112 for input into the model 120. The filter 110 can filter a time series of data samples. The time series of data samples can include a time series of power values or a time series of speed values. The filter 110 can process the time series of data samples to adjust an impact of one or more samples of the time series of data samples on predictions or determinations made by the route generator 112. For example, the filter 110 can process the time series of data such that recent samples in the time series are weighted more heavily than older samples in the time series. The filter 110 can process the time series of data samples to decrease an impact of older samples of the time series of data samples relative to newer samples of the time series of data samples on predictions or determinations made by the route generator 112.

The filter 110 can include, or be configured to apply, a Kalman filter to the time series of data. In some cases, the filter 110 can fit the time series of data samples to a cubic polynomial curve to adjust an impact of one or more samples of the time series of data samples on predictions or determinations made by the route generator 112.

The filter 110 can bucketize or bin data samples. The filter 110 can reduce the granularity or resolution of values of the data samples by assigning the values to predetermined bins or bucket. A bin or a bucket can refer to a category, label, or value that is assigned to a range of numeric values. The filter 110 can convert numerical features into categorical features by using a set of thresholds to reduce complexity of the model 120 and handle skewed data distributions. For example, a label or category of "fast" can be assigned to numeric speed values over 55 miles per hour; the label "medium" can be assigned to numeric speed values between 35 and 55 miles per hour; and the label "slow" can be assigned to numeric speed values less than 35 miles per hour. The filter 110 can bucketize data samples with numeric labels, such as by assigning speed values that fall within the range 30 to 40 miles per hour with the numeric value 35 miles per hour. The bucketized label can be used as a speed feature. Thus, the filter 110 can bucketize or bin data samples to generate a speed feature, which can be input to the model 120 or otherwise used by the route generator 112. The filter 110 can bucketize speed time series or power time series data samples, or any other type of data samples received by the data collector 106 that can be feed into the model 120 or otherwise used by the route generator 112 to facilitate dynamic route generation and charger discovery.

The data processing system 102 can include a route generator 112 designed, constructed and operational to generate or update a drive route. The route generator 112 can identify a drive route for a vehicle 130. The drive route can include a first location, such as a current location or starting point. The drive route can include another location, such as a destination, end location, final location, intermediary location, or waypoint. The drive route can include a path to traverse from the first location to the second location. The drive route can include one or more chargers located along the drive route. The chargers 146 can be configured to charge the battery of the vehicle 130. The drive route can indicate an amount of time or duration to charge the vehicle at the charger. The drive route can indicate the state of charge or range estimate of the battery at various points throughout the drive route.

The drive route initially identified by the route generator 112 can be a drive route that was generated or established prior to the vehicle beginning the trip. For example, the initial drive route can be generated when the vehicle is still at the first location or starting location. In some cases, the identified drive route can be a drive route that was dynamically generated during the course of the trip. In some cases, the performance of a single trip can include the generation of multiple different drive routes that were dynamically generated throughout the trip based on changing characteristics of the vehicle as predicted or determined by the data processing system 102.

The route generator 112 can receive data samples or filtered data corresponding to an indication of an amount of power output by the battery of the vehicle and an indication of a speed of the vehicle as the vehicle traverses the drive route. The route generator 112 can determine or predict, via a model 120 trained with machine learning, a characteristic of the vehicle 130 based on the amount of power and the speed. For example, the route generator 112 can determine or predict the characteristic with a time series of data samples adjusted based on application of the filter 110. The route generator 112 can determine or predict, via the model 120, the characteristic with the time series of data samples fitted to a cubic polynomial curve. In some cases, the route generator 112 can input the bucketized speed feature or power feature into the model to determine the characteristic.

The characteristic of the vehicle 130 determined or predicted by the route generator 112 can indicate whether to update the drive route previously identified by the data processing system 102. The characteristic can refer to, include, or indicate one or more of: a change in driving mode, an unforeseen driving behavior, mass estimation or drag being higher than previously determined, battery pre-conditioning timing being longer than predicted due to changes in weather or temperature, or a prediction that an improved route can be determined based on mass estimation change (e.g., towing or large load in truck bed) combined with drive mode.

The route generator 112 can update, responsive to the characteristic determined or predicted via the model 120 based on the amount of power and the speed, the drive route to include a second charger at a second location to charge the battery of the vehicle. The second location can be different from the first location of the first charger that was initially identified as part of the drive route. Updating the drive route can refer to or include modifying the drive route to change at least one aspect of the drive route. In some cases, updating the drive route can refer to or include creating a second drive route that is different than the previously identified drive route. The data processing system 102 can discard the previously identified drive route upon creating the second drive route to reduce memory or storage utilization, for example.

Figure 2:
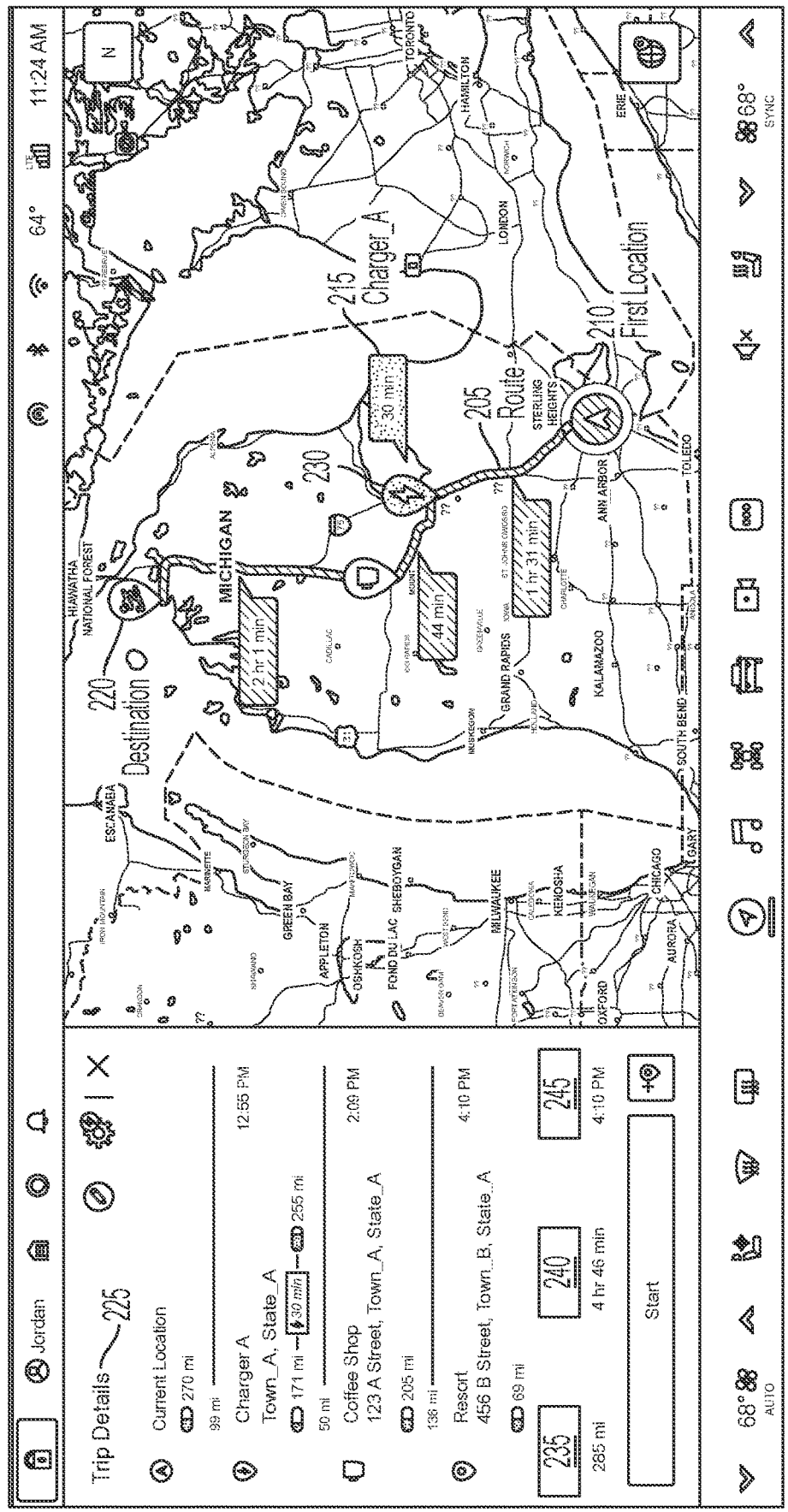
FIG. 2 depicts an example graphical user interface for dynamic route generation and charger discovery.
Figure 3:
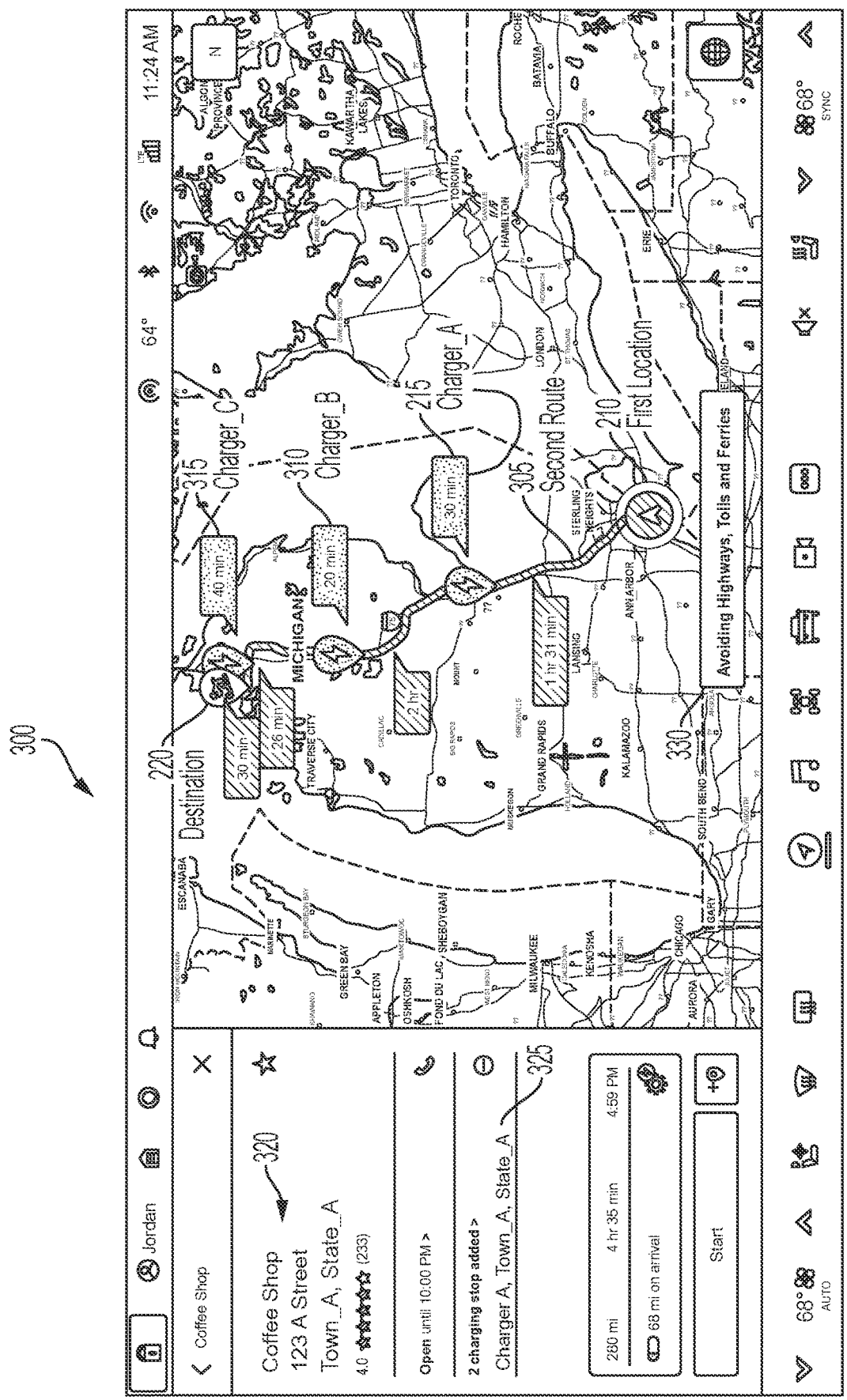
FIG. 3 depicts an example graphical user interface for dynamic route generation and charger discovery.

In some cases, the route generator 112 can update the drive route by replacing the first charger in the drive route with the second charger. The updated drive route can include a single charger, such as the second charger. For example, the second location of the second charger may be closer to the vehicle 130 relative to the first location of the first charger that was in the previously identified drive route. The route generator 112 can determine to select the closer charger due to the characteristic of the vehicle predicted or determined via the model 120. For example, the route generator 112 can detect an increase in drag of the vehicle due to towing a trailer, which may not have been taken into account when the initial drive route was established. The route generator 112 can provide, for display via a user interface of the vehicle 130, a digital map comprising the drive route updated with the second charger at the second location, as illustrated in FIG. 2 or FIG. 3. In some cases, the route generator 112 can add the second charger to the drive route such that the drive route includes both the first charger and the second charger.

The data processing system 102 can determine, based on the characteristic indicating an increased drag or mass due to towing, that the vehicle is coupled with a trailer towed behind the vehicle 130. The data processing system 102 can select the second charger at the second location via an affordance compatibility technique applied to a layout at the second location and the determination that the vehicle is coupled with the trailer. For example, the data processing system 102 can access a site map of the charger location to determine whether a vehicle towing a trailer can pull into or proximate to the charger such that a power cable of the charger can couple with the vehicle 130. Some charging stations may have constraints whereby a trailer is not allowed or not accessible for vehicles towing a trailer. Thus, the data processing system 102 of this technical solution can determine that the vehicle is towing a trailer, and then update the drive route by using an affordance compatibility technique. An affordance compatibility technique can refer to determining that a layout or geometry of a charging site or charger is compatible or allows an object with certain dynamics to drive to the charger and park close enough to the charger such that a charge port on the vehicle can receive a charge plug of a cable connected to the charger.

The data processing system 102 can update the drive route responsive to expiration of a time interval, or the characteristic. The data processing system 102 can update the drive route responsive to a condition of operation of the vehicle satisfying a threshold. For example, the condition can include at least one of the speed, acceleration, elevation, mass of the vehicle, drag of the vehicle, or temperature. For example, the data processing system 102 can determine to update the drive route if the vehicle is traveling faster than 65 miles per hour for more than 5 minutes. The data processing system 102 can update the drive route to include a time to precondition the battery prior to arrival of the vehicle at the second charger at the second location.

The route generator 112 can identify a profile 124 loaded onto the vehicle. The data processing system 102 can load the profile based on the user or driver of the vehicle. The data processing system 102 can detect a key fob of the driver of the vehicle. The key fob can be linked to a profile stored in the data repository 114 of the vehicle, or in the server system 140. The data processing system 102 can load the profile 124 corresponding to, or linked to, the key fob. In some cases, the driver or user of the vehicle 130 can select a profile via a graphical user interface or dashboard of the vehicle. The data processing system 102 can, in some cases, automatically load the profile 124 responsive to the user or driver unlocking the doors of the vehicle 130 via the key fob, entering the vehicle 130, starting the vehicle 130, or driving the vehicle 130.

The profile 124 can indicate one or more preferences. The profile 124 can include or indicate preferences for at least one of charger type, charger speed, charger operator, or charger layout. The route generator 112 can generate the initial drive route based on the profile 124. The route generator 112 can update the drive route based on the profile 124. The route generator 112 can select the second charger based at least in part on the one or more preferences indicated in the profile 124 loaded onto the vehicle 130. For example, the route generator 112 can identify multiple candidate chargers based on a predicted characteristic of the vehicle 130. The route generator 112 can select, from the multiple candidate chargers, the second charger that matches the greatest number of preferences of the profile 124. For example, the candidate chargers can include a second charger of a first type and a third charger of a second type. Both the second charger and the third charger can be viable candidate chargers for inclusion in the drive route. However, the profile 124 can include a preference for chargers of the first type. Thus, the route generator 112 can prioritize selection of the second charger of the first type based on the profile 124 indicating a preference for chargers of the first type.

In another example, the candidate chargers can include a second charger that is part of a first charging network and a third charger that is part of a second charging network. Both the second charger and the third charger can be viable candidate chargers for inclusion in the drive route. However, the profile 124 can include a preference for chargers that are part of the first charging network. Thus, the route generator 112 can prioritize selection of the second charger of that is part of the first charging network based on the profile 124 indicating a preference for chargers in the first charging network.

In another example, the candidate chargers can include a second charger that is located in a charging station with level 2 charging and a third charger that is located in a charging station with level 3 charging. Both the second charger and the third charger can be viable candidate chargers for inclusion in the drive route. However, the profile 124 can include a preference for chargers that are part of a level 2 charging station. Thus, the route generator 112 can prioritize selection of the second charger of that is part of the level 2 charging station based on the profile 124 indicating a preference for level 2 chargers. Level 1 charging can refer to 110 Volt charger, level 2 can refer to 240 Volt charging, and level can refer to 480 Volt charging, for example.

The route generator 112 can leverage different application programming interfaces ("APIs") involving different charging networks in addition to charging networks owned and operated by the manufacturer of the vehicle 130. The route generator 112 can select or route the vehicle 130 to a charging station or charger 146 based on the available charging station ports (e.g., North American Charging Standard "NACS", Combined Charging System "CCS") at a particular charging station and what port is equipped on the vehicle 130. The route generator 112 can route the vehicle 130 based on preferences or configurations in the profile 124 and available charging station ports.

FIG. 2 depicts an example graphical user interface (GUI) 200 for dynamic route generation and charger discovery. The graphical user interface (GUI) 200 can provided by the data processing system 102 (e.g., via interface 104). The GUI 200 can display a drive route 205. The drive route 205 can be an initial drive route or a drive route that is established before the vehicle begins the trip (e.g., before the vehicle leaves or departs from the first location 210 towards the destination 220). The drive route 205 can include a first location 210, which can be a starting location. The drive route 205 can include a first charger, such as Charger_A 215, at a first location. The drive route 205 can include a destination 220. The drive route 205 can indicate an amount of time or charging duration 230 at Charger_A 215, such as 30 minutes. The drive route 205 can indicate the travel time between various segments of the drive route, such as from the first location 210 to the Charger_A 215, and Charger_A 215 to the destination 220. The GUI 200 can provide trip details 225, such as charger information, coffee shop or other restaurant or café or retail information, lodging information, and overall trip duration or miles information. The charger 215 can refer to or include one or more component or functionality of charger 146. The charger 215 can be located at a site, station, or location along the drive route. The GUI 200 can indicate the distance of the drive route as 285 miles (235), the duration of the drive route as 4 hours and 46 minutes (240), and an estimated arrival time at the destination as 4:10 PM (245).

FIG. 3 depicts an example graphical user interface for dynamic route generation and charger discovery. The GUI 300 can include one or more component or element depicted in GUI 200 of FIG. 2. The graphical user interface 300 can be provided by the data processing system 102 (e.g., via interface 104). The GUI 300 can indicate a second drive route 305. The second drive route 305 can refer to or include a drive route that is dynamically generated or updated by the data processing system 102 based on characteristics of the vehicle determined via model trained with machine learning. The second drive route 305 can include the same first location 210 and destination 220 as the first drive route 205 depicted in GUI 200 of FIG. 2. However, the second drive route can include different or additional chargers Charger_B 310 and Charger_C 315 at different locations. In some cases, the second drive route 305 can include the same first charger Charger_A 215 as in the initial drive route. In some cases, the second drive route 305 can replace the first charger_A 215 with a different charger at a different location.

The drive route 305 can indicate an amount of time to charge at each charger 215, 310 and 315. The drive route 305 can indicate the duration of travel between the different locations. The GUI 300 can include information about a coffee shop 320, a charger information 325, or other trip details. In some cases, the updated drive route 305 can include a notification 330 or instruction that the drive route avoids highways, tolls and ferries. The notification 330 can include a pop-up window or alert. The notification 330 can be based on a configuration, preference, or profile established by the user of the vehicle.

Figure 4:
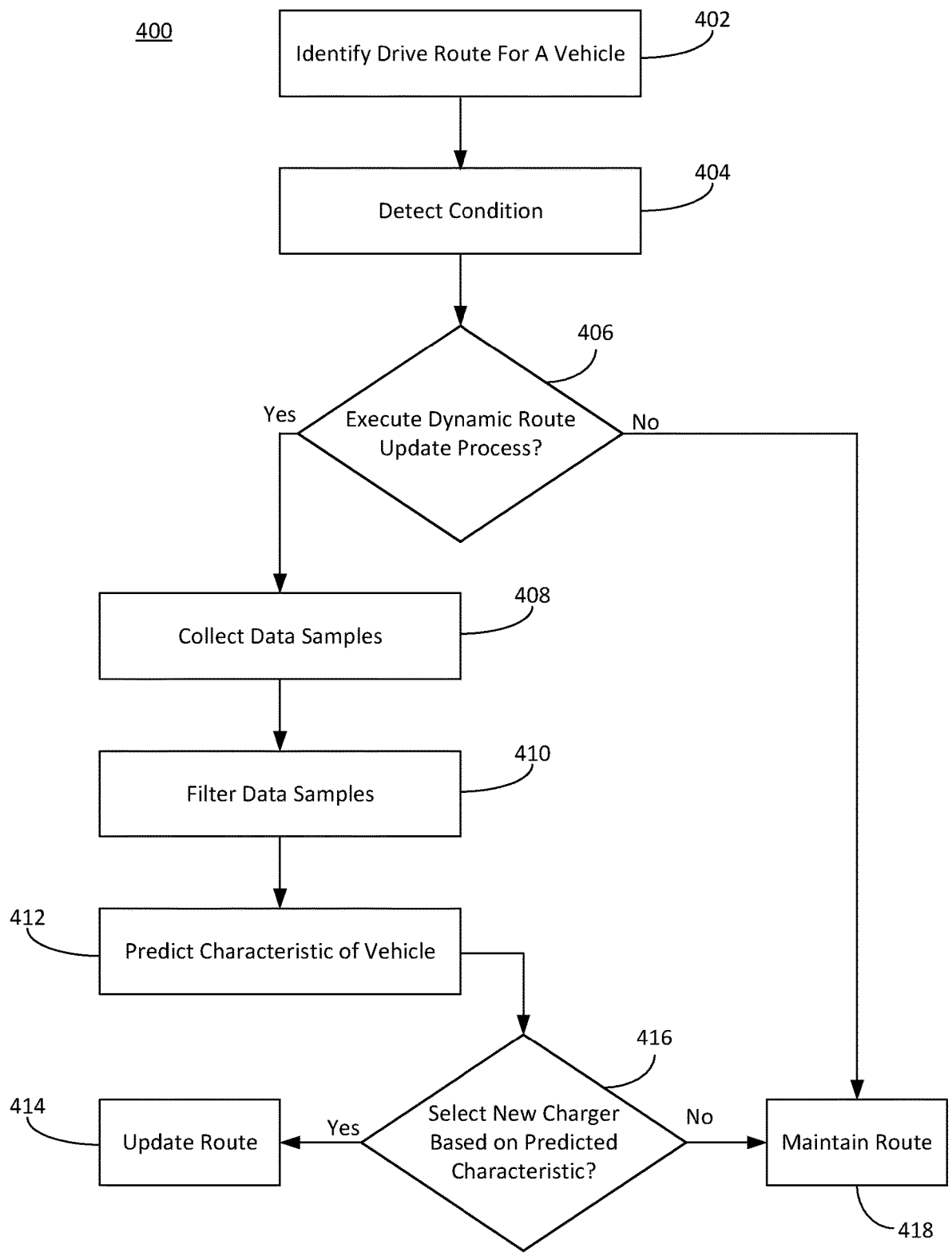
FIG. 4 depicts an example method for dynamic route generation and charger discovery.

FIG. 4 depicts an example method 400 for dynamic route generation and charger discovery. The method 400 can be performed by one or more systems of components depicted in FIG. 1 or FIG. 7, including, for example, a data processing system. At ACT 402, the data processing system can identify a drive route for a vehicle. The drive route can be a drive that was initially generated for the vehicle to go from the start location to the destination. The drive route can be a drive route that was generated while the vehicle is driving along the drive route. The drive route can be a drive that was previously generated for the vehicle, but after the vehicle departed from the start location and before the vehicle arrives at the destination. The data processing system can retrieve the drive route from memory of the data processing system, or a data repository. The data processing system can receive the drive route from a remote server or cloud server via a network. The data processing system can receive the drive route from a mobile computing device, such as a mobile smart phone, laptop computer, or other computing device. The data processing system can, in some cases, generate the drive route. For example, a user of the vehicle can input a destination via a graphical user interface or dashboard provided by the data processing system of the vehicle. The data processing system can determine a current location of the vehicle and set the first location as the current location. The data processing system can, based on the first location and destination, determine a drive route. The data processing system can determine that the user of the vehicle intends to execute the drive route contemporaneously with generation of the drive route.

The data processing system can generate the drive route at ACT 402 based on the current conditions associated with the vehicle or environment at the starting point or first location. The data processing system can generate the drive route at ACT 402 based on forecasted conditions (e.g., traffic or weather) along the drive route. The data processing system can generate the drive route at ACT 402 based on determining a forecast of conditions along the drive route, where the forecast is obtained at a time stamp corresponding to when the drive route is generated. In some cases, a user may input, at the time of generation of the drive route, a departure time for the drive route or a desired arrival time at the destination. The data processing system can use the departure time or desired arrival time to generate the drive route. The data processing system can use the desired arrival time to determine a departure time for the vehicle. The data processing system can predict or to forecast conditions for the departure or arrival times along candidate drive routes, and select the drive routes based on the predicted or forecasted conditions. The data processing system can take into account attributes associated with the vehicle in order to generate the drive route, such as a state of health of the battery, state of charge of the battery, mass of the vehicle, or other attributes that can impact the range of the vehicle and charging the vehicle.

At ACT 404, the data processing system can detect a condition, such as expiration of a time interval (e.g., 5 minute counter to refresh drive route) or exceeding a speed or acceleration threshold. The condition can refer to or include a condition, event, or trigger that causes or instructs the vehicle to refresh, update, modify, re-evaluate, or re-generate the drive route that was identified at ACT 402. For example, the condition can include a change in one or more of the battery state of charge, battery health, weather, traffic, or drive mode of the vehicle. The condition can include a vehicle speed or acceleration being greater than a threshold for a time interval. The condition can include a change in mass of the vehicle or drag of the vehicle. For example, the condition can include detecting that the vehicle is towing a trailer, which can impact the drag of the vehicle.

In some cases, the data processing system can detect the condition responsive to a change in a drive mode of the vehicle. Drive modes can include, for example, comfort mode, economy mode, sport mode, snow mode, off-road, or other drive modes. The data processing system can detect the change in the drive mode responsive to a user or driver of the vehicle changing the drive mode via a graphical user interface of the vehicle. In some cases, the data processing system can automatically change the drive mode responsive to detecting a change in an attribute of the surface or environment on which the vehicle traverses (e.g., from driving on pavement to driving on a dirt path or other off-road surface, or a change in the driving behavior). Thus, the data processing system can determine, at decision block 406, to execute the dynamic route update process responsive to a change in the drive mode.

At decision block 406, the data processing system can determine whether to execute a dynamic route update process based on the condition detected at 404. For example, if the condition is a refresh timer or speed or acceleration threshold being met, then the data processing system can proceed to ACT 408 to execute the dynamic route update process. If the condition includes determining that the change in drag of the vehicle is greater than a drag threshold, then the data processing system can determine to execute a dynamic route update process in order to determine whether to generate and invoke a new drive route for the vehicle.

In some cases, at decision block 406, the data processing system can determine to not execute the dynamic route refresh process if the route is nearly complete (e.g., 95% complete), and proceed to maintain the route at ACT 418 in order to reduce or conserve computing processor or energy utilization. If, however, the data processing system determines at decision block 406 to execute the dynamic route update process, the data processing system can proceed to ACT 408 to collect data samples. The data samples can include a time series of data. A time series can include or refer to a sequence of data points or values collected at successive time intervals. The time series can represent the variation or change in a particular variable over time. In a time series, the data samples can be measured, sensed, or recorded and ordered chronologically, with each observation associated with a specific timestamp or time period. The time series data can be collected at regular intervals, such as every second, 2 seconds, 3 seconds, 5 seconds, 10 seconds, 30 seconds, 60 seconds, 5 minutes, 10 minutes, 15 minutes, 30 minutes, hourly, every 6 hours, or daily. For example, the data processing system can collect time series data samples at ACT 408 from one or more sensors of the vehicle or remote data sources. For example, the data processing system can collect information on the amount of power being used by the vehicle to drive the vehicle along the drive route, the speed of the vehicle, the acceleration of the vehicle, altitude of the vehicle, mass being driven by the vehicle (e.g., including the vehicle itself), or amount of drag on the vehicle as the vehicle drives. The data processing system can collect information on weather or traffic. The data processing system can request user input for additional information, such as via a graphical user interface.

The data processing system can proceed to ACT 410 to filter the collected data samples. The data processing system can apply a filter to the time series of data samples to adjust an impact of one or more samples of the time series of data samples on the prediction of a characteristic that can impact the drive route. For example, the data processing system can bucketize or bin one or more types of time series of data samples. The data processing system can fit the time series of data samples to a cubic polynomial curve, or apply a Kalman filter, for example.

The data processing system can proceed to ACT 412 to predict a characteristic of the vehicle based on the filtered or collected data samples. For example, the data processing system can feed the filtered data samples into a model trained with machine learning to determine a characteristic of the vehicle.

For example, the data processing system can determine or predict the characteristic with a time series of data samples. The data processing system can determine or predict, via a model trained with historical battery consumption data, the characteristic with the time series of data samples. The data processing system can determine or predict the characteristic which can indicate whether to update the drive route previously identified by the data processing system. The characteristic can refer to, include, or indicate one or more of: a change in driving mode, an unforeseen driving behavior, mass estimation or drag being higher than previously determined, battery preconditioning timing being longer than predicted due to changes in weather or temperature, or a prediction that an improved route can be determined based on mass estimation change (e.g., towing or large load in truck bed) combined with drive mode.

At decision block 416, the data processing system can determine whether to select a new charger based on the characteristic predicted or determined at 412. The data processing system can determine to select a new charger if the characteristic indicates that that the range of the vehicle is reduced such that the vehicle does not have sufficient range to drive from one charger to another charger between segments of the drive route. In another example, the data processing system can determine based on the characteristic to charge more frequently, but for reduced amounts of time, at one or more fast chargers. In another example, the data processing system can determine that a site layout of a selected charger is not compatible with the characteristic indicating that the vehicle is towing at trailer, which may block or obfuscate access to the charger or charge plug.

If the data processing system determines to select a new charger (e.g., if the driving behavior indicates a decrease in efficiency or a prediction that the vehicle is towing a trailer that does not fit at the previously selected charging station), then the data processing system can proceed to ACT 414 to update the drive route with a new charger. If, however, the data processing system determines at decision block 416 to not change the drive route, the data processing system can proceed to ACT 418 to maintain the drive route.

At 414, the data processing system can update the drive route with a second charger. The data processing system can select a second charger to include in the drive route. The data processing system can include the second charger in addition to the first charger. The data processing system can remove the first charger and generate an updated drive route that includes only the second charger. The data processing system can remove the first charger and generate an updated drive route that includes the second charger and one or more additional chargers that are different from the first charger. Thus, the data processing system can generate an updated drive route that is more accurate based at least in part on improved range estimates from data collected in real-time during the drive route that is input into a model trained with historical battery consumption data.

The data processing system can select the second charger based on a profile loaded onto the vehicle. The profile can include charger preferences. The data processing system can identify a profile loaded onto the vehicle. The data processing system can identify or detect the profile responsive to a driver or user of the vehicle unlocking the doors of the vehicle using a key fob, or the driver or user selecting a profile from a user interface of the vehicle. In some cases, the profile can be the default profile for the vehicle. The profile indicating one or more preferences for at least one of charger type, charger speed, charger operator, or charger layout. The data processing system can identify multiple candidate chargers based on the characteristic, and then select the second charger from the candidate chargers based at least in part on the one or more preferences indicated in the profile loaded onto the vehicle.

In some cases, the data processing system can filter out, block, remove or prevent certain chargers from becoming candidate chargers based on the preferences of the charger. For example, the profile can indicate to not charge at any charger that is in a certain charging network, of a certain charging type, or in a certain layout. For example, if the vehicle is towing a trailer, then the profile can include a preference that that prevents selecting chargers in a site or orientation that is not configured or compatible with vehicles towing a trailer.

Figure 5:
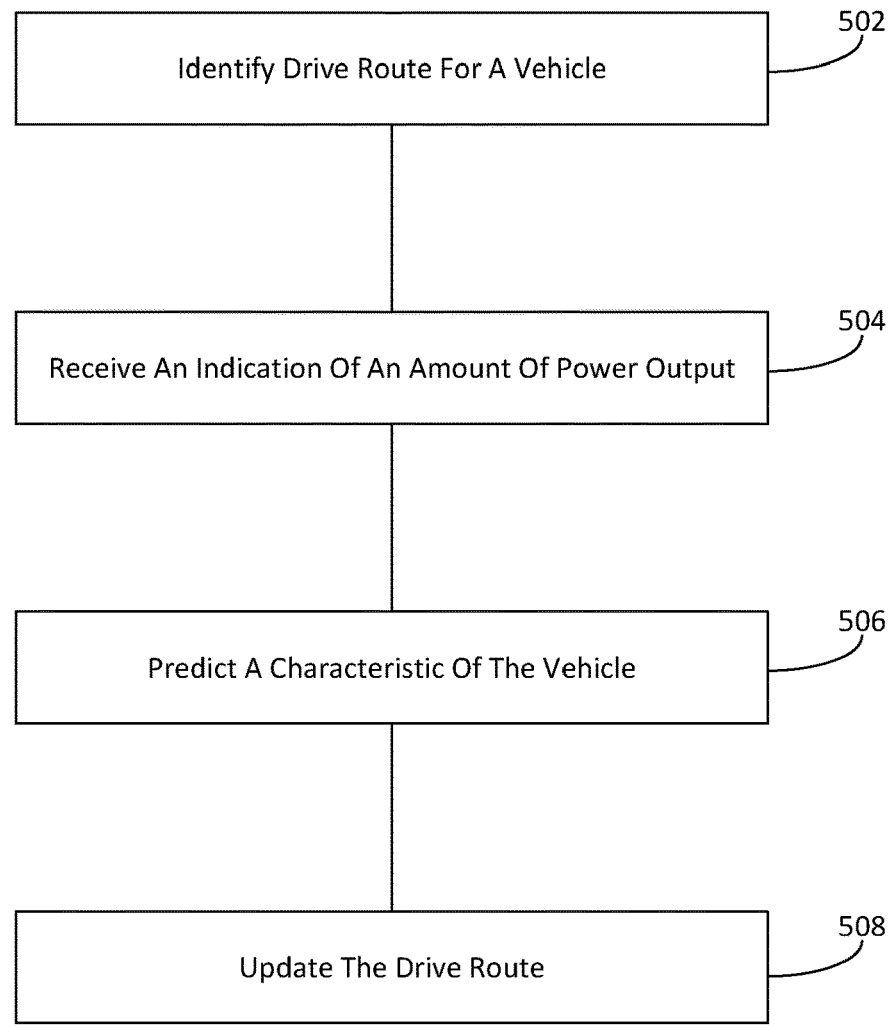
FIG. 5 depicts an example method for dynamic route generation and charger discovery.

FIG. 5 depicts an example method 500 for dynamic route generation and charger discovery. The method 500 can be performed by one or more systems of components depicted in FIG. 1 or FIG. 7, including, for example, a data processing system. At ACT 502, the data processing system can identify a drive route for a vehicle. The data processing system can retrieve a previously generated drive route, or generate a drive route at ACT 502. The data processing system can obtain an initial drive route that was generated before the vehicle begins driving along the drive route. The data processing system can retrieve a drive route that itself was a refresh or updated drive route generated while the vehicle was driving along a previously generated drive route.

At ACT 504, the data processing system an receive an indication of an amount of power output by a battery of the vehicle. The indication of the amount of power output by the battery can include a time series of data samples or measurements of power output by the battery. The battery can refer to an entire battery used to power the electric vehicle, including driving the electric motors. The data processing system can receive the measurement or time series of measurements from a battery management system of the vehicle. The data processing system can receive an indication of the speed of the vehicle as a time series of data samples.

At ACT 506, the data processing system can predict a characteristic of the vehicle. The data processing system can input the time series of data samples into a model trained with historical battery consumption data in order to determine or predict the characteristic. The model can be trained using machine learning. The characteristic can indicate that the drag of the vehicle is greater than a threshold. The threshold can be based on a prior drag determination that was used to generate the previous drive route. The characteristic can include a mass of the vehicle or indicate that the vehicle is coupled with a trailer towed behind the vehicle.

At ACT 508, the data processing system can update the drive route. The data processing system can update the drive route during traversal of the initial drive route to provide a more accurate drive route. The data processing system can generate a new drive route or modify the previously generated drive route, or update a drive route currently in execution. The data processing system can use the characteristic to generate the new drive route. The new drive route can include one or more additional chargers relative to the previously generated drive route, can include at least one different charger, or can include at least one different charge duration (e.g., a longer charge duration or a shorter charge duration at a particular charger along the drive route).

Figure 6:
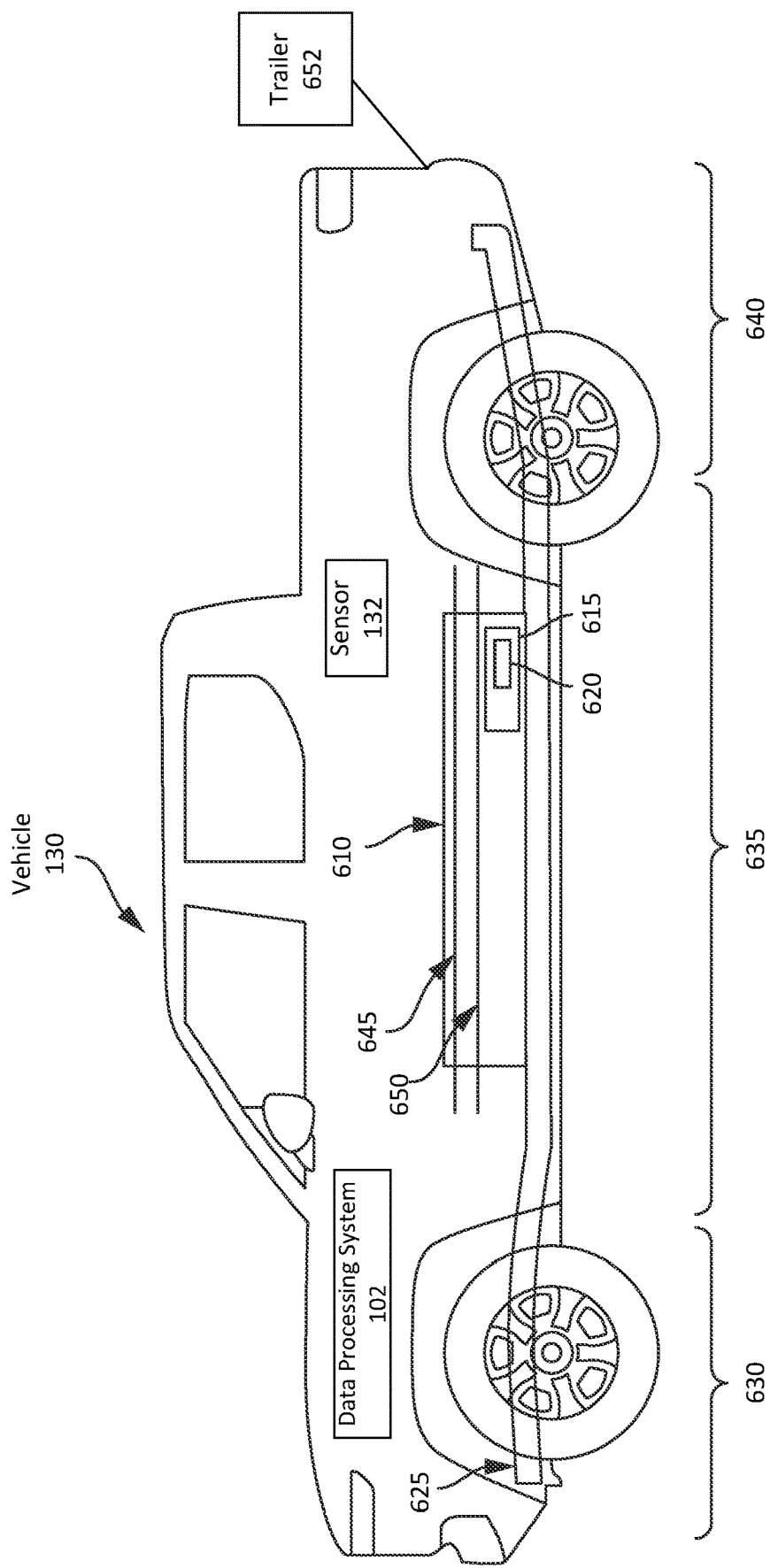
FIG. 6 depicts an example vehicle.

FIG. 6 depicts an example vehicle 130. The vehicle 130 can include the data processing system 102 and the sensors 132. The vehicle 130 can be installed with at least one battery pack 610. Vehicle 130 can be an electric vehicle. Electric vehicles 130 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 610 can also be used as an energy storage system to power a building, such as a residential home or commercial building. Electric vehicles 130 can be fully electric or partially electric (e.g., plug-in hybrid) and further, electric vehicles 130 can be fully autonomous, partially autonomous, or unmanned. Electric vehicles 130 can also be human operated or non-autonomous. Electric vehicles 130 such as electric trucks or automobiles can include on-board battery packs 610, batteries 615 or battery modules 615, or battery cells 620 to power the electric vehicles. The electric vehicle 130 can include a chassis 625 (e.g., a frame, internal frame, or support structure). The chassis 625 can support various components of the electric vehicle 130. The chassis 625 can span a front portion 630 (e.g., a hood or bonnet portion), a body portion 635, and a rear portion 640 (e.g., a trunk, payload, or boot portion) of the electric vehicle 130. The battery pack 610 can be installed or placed within the electric vehicle 130. For example, the battery pack 610 can be installed on the chassis 625 of the electric vehicle 130 within one or more of the front portion 630, the body portion 635, or the rear portion 640. The battery pack 610 can include or connect with at least one busbar, e.g., a current collector element. For example, the first busbar 645 and the second busbar 650 can include electrically conductive material to connect or otherwise electrically couple the battery 615, the battery modules 615, or the battery cells 620 with other electrical components of the electric vehicle 130 to provide electrical power to various systems or components of the electric vehicle 130.

For example, the battery cell 620 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 620 to separate the anode and cathode from each other and to facilitate transfer of lithium ions between the anode and cathode. It should be noted that battery cell 620 can also take the form of a solid state battery cell developed using solid electrodes and solid electrolytes.

In some cases, the vehicle 130 can tow a trailer 652. The trailer 652 can be coupled to the rear portion 640 of the vehicle via a tow hitch. The trailer 652 can have a length and width. The trailer 652 can carry or convey objects or materials. The trailer 652 can be powered or lack power. The trailer 652 may or may not be electrically coupled to the vehicle 130.

Figure 7:
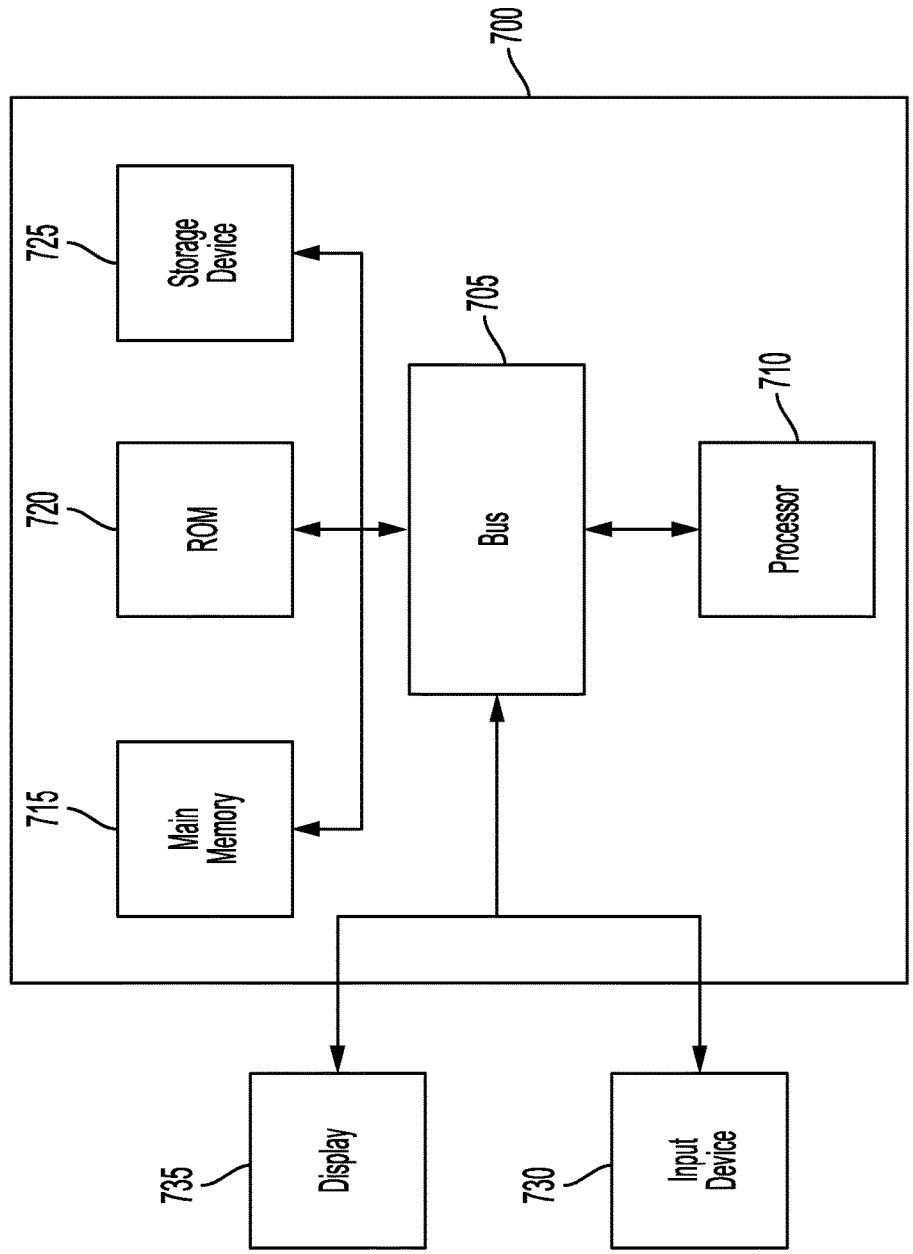
FIG. 7 is a block diagram illustrating an architecture for a computer system that can be employed to implement elements of the systems and methods described and illustrated herein, including, for example, the systems depicted in FIG. 1, the graphical user interfaces depicted in FIG. 2 and FIG. 3, and the methods depicted in FIG. 4 and FIG. 5.

FIG. 7 depicts an example block diagram of an example computer system 700. The computer system or computing device 700 can include or be used to implement a data processing system or its components. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be used for storing information during execution of instructions by the processor 710. The computing system 700 can further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions.

The computing system 700 can be coupled via the bus 705 to a display 735, such as a liquid crystal display, or active matrix display, for displaying information to a user such as a driver of the electric vehicle 130 or other end user. An input device 730, such as a keyboard or voice interface can be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement can also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a computing system comprising one or more processors, coupled with memory, to:
        identify a drive route for a vehicle comprising a first charger at a first location along the drive route configured to charge one or more batteries of the vehicle;
        receive, via a battery management system of the vehicle, an indication of an amount of power output by the one or more batteries of the vehicle and an indication of a speed of the vehicle as the vehicle traverses the drive route;
        predict, via a model trained with historical battery consumption data, a characteristic of the vehicle based on the amount of power and the speed;
        detect that the characteristic of the vehicle indicates a change in an amount of time to precondition the one or more batteries of the vehicle; and
        replace, responsive to detection of the change in the amount of time to precondition the one or more batteries, the drive route to include with a second drive route that includes an indication of a second charger at a second location, different from the first location, to charge the one or more batteries of the vehicle.

2. The system of claim 1, comprising the computing system to:
    provide, for display via a user interface of the vehicle, a digital map comprising the second drive route that includes the second charger at the second location.

3. The system of claim 1, wherein the indication of the amount of power comprises a time series of data samples, comprising the computing system to:
apply a filter to the time series of data samples to adjust an impact of one or more samples of the time series of data samples on prediction of the characteristic of the vehicle; and
predict, via the model, the characteristic of the vehicle with the time series of data samples adjusted based on application of the filter.

4. The system of claim 1, wherein the indication of the amount of power comprises a time series of data samples, and comprising the computing system to:
fit the time series of data samples to a cubic polynomial curve to adjust an impact of one or more samples of the time series of data samples on prediction of the characteristic of the vehicle; and
predict, via the model, the characteristic of the vehicle with the time series of data samples fitted to the cubic polynomial curve.

5. The system of claim 1, wherein the indication of the speed comprises a time series of data samples, and comprising the computing system to:
apply a filter to the time series of data samples to decrease an impact of older samples of the time series of data samples relative to newer samples of the time series of data samples on prediction of the characteristic of the vehicle; and
predict, via the model, the characteristic of the vehicle with the time series of data samples adjusted based on application of the filter.

6. The system of claim 1, comprising the computing system to:
bucketize the indication of the speed to generate a speed feature; and
input the speed feature into the model to determine the characteristic of the vehicle.

7. The system of claim 1, comprising the computing system to:
identify a profile loaded onto the vehicle, the profile indicating one or more preferences for at least one of charger type, charger speed, charger operator, or charger layout; and
select the second charger based at least in part on the one or more preferences indicated in the profile loaded onto the vehicle.

8. The system of claim 1, comprising the computing system to:
determine, based on the characteristic, that the vehicle is coupled with a trailer towed behind the vehicle; and
select the second charger at the second location via an affordance compatibility technique applied to a layout at the second location and responsive to determination that the vehicle is coupled with the trailer.

9. The system of claim 1, comprising the computing system to:
receive data corresponding to at least one of a mass of the vehicle, a drive mode of the vehicle, an elevation of the drive route, or weather along the drive route; and
determine, via the model, the characteristic of the vehicle based on the data.

10. A method, comprising:
identifying, by a computing system comprising one or more processors coupled with memory, a drive route for a vehicle comprising a first charger at a first location along the drive route configured to charge one or more batteries of the vehicle;
receiving, by the computing system via a battery management system of the vehicle, an indication of an amount of power output by the one or more batteries of the vehicle and an indication of a speed of the vehicle as the vehicle traverses the drive route;
predicting, by the computing system via a model trained with historical battery consumption data, a characteristic of the vehicle based on the amount of power and the speed;
detecting, by the computing system, that the characteristic of the vehicle indicates a change in an amount of time to precondition the one or more batteries of the vehicle; and
replacing, by the computing system, responsive to detecting the change in the amount of time to precondition the one or more batteries, the drive route with a second drive route that includes an indication of a second charger at a second location, different from the first location, to charge the one or more batteries of the vehicle.

11. The method of claim 10, comprising:
providing, by the computing system for display via a user interface of the vehicle, a digital map comprising the second drive route that includes the second charger at the second location.

12. The method of claim 10, wherein the indication of the amount of power comprises a time series of data samples, comprising:
applying, by the computing system, a filter to the time series of data samples to adjust an impact of one or more samples of the time series of data samples on predicting the characteristic of the vehicle; and
predicting, by the computing system via the model, the characteristic of the vehicle with the time series of data samples adjusted based on application of the filter.

13. The method of claim 10, wherein the indication of the amount of power comprises a time series of data samples, and comprising:
fitting, by the computing system, the time series of data samples to a cubic polynomial curve to adjust an impact of one or more samples of the time series of data samples on predicting the characteristic of the vehicle; and
predicting, by the computing system via the model, the characteristic of the vehicle with the time series of data samples fitted to the cubic polynomial curve.

14. The method of claim 10, wherein the indication of the speed comprises a time series of data samples, comprising:
applying, by the computing system, a filter to the time series of data samples to decrease an impact of older samples of the time series of data samples relative to newer samples of the time series of data samples on predicting the characteristic of the vehicle; and
predicting, by the computing system via the model, the characteristic of the vehicle with the time series of data samples adjusted based on application of the filter.

15. The method of claim 10, comprising:
binning, by the computing system, the indication of the speed to generate a speed feature; and
inputting, by the computing system, the speed feature into the model to determine the characteristic of the vehicle.

16. An electric vehicle, comprising:
one or more batteries;
a battery management system to control performance of the one or more batteries; and
a computing system, comprising one or more processors and memory, to:

identify a drive route for the electric vehicle comprising a first charger at a first location along the drive route configured to charge the one or more batteries;

receive, via the battery management system of the electric vehicle, an indication of an amount of power output by the one or more batteries and an indication of a speed of the electric vehicle as the electric vehicle traverses the drive route;

predict, via a model trained with historical battery consumption data, a characteristic of the electric vehicle based on the amount of power and the speed;

detect that the characteristic of the electric vehicle indicates a change in an amount of time to precondition the one or more batteries; and replace, responsive to detection of the change in the amount of time to precondition the one or more batteries, the drive route with a second drive route that includes an indication of a second charger at a second location, different from the first location, to charge the one or more batteries.

* * * * *